US009231983B2

United States Patent
Kennedy

(10) Patent No.: US 9,231,983 B2
(45) Date of Patent: Jan. 5, 2016

(54) METHODS AND SYSTEMS FOR PROVIDING TRUSTED SIGNALING OF DOMAIN-SPECIFIC SECURITY POLICIES

(71) Applicant: Citrix Systems Inc., Fort Lauderdale, FL (US)

(72) Inventor: John Kennedy, Los Olivos, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 14/582,633

(22) Filed: Dec. 24, 2014

(65) Prior Publication Data

US 2015/0180904 A1    Jun. 25, 2015

Related U.S. Application Data

(63) Continuation of application No. 13/274,756, filed on Oct. 17, 2011, now abandoned.

(51) Int. Cl.
*G06F 21/57* (2013.01)
*H04L 29/06* (2006.01)

(52) U.S. Cl.
CPC ............... *H04L 63/20* (2013.01); *G06F 21/57* (2013.01); *H04L 63/0209* (2013.01); *H04L 63/0823* (2013.01)

(58) Field of Classification Search
CPC ..................................................... G06F 21/50
USPC ............................................................ 726/1
See application file for complete search history.

(56) References Cited

U.S. PATENT DOCUMENTS

| 5,553,083 | A | 9/1996 | Miller |
| 5,727,002 | A | 3/1998 | Miller et al. |
| 5,764,235 | A | 6/1998 | Hunt et al. |
| 5,826,025 | A | 10/1998 | Gramlich |
| 5,845,265 | A | 12/1998 | Woolston |
| 5,956,027 | A | 9/1999 | Krishnamurthy |
| 6,081,829 | A | 6/2000 | Sidana |
| 6,167,432 | A | 12/2000 | Jiang |
| 6,246,758 | B1 | 6/2001 | Low et al. |
| 6,249,291 | B1 | 6/2001 | Popp et al. |
| 6,343,313 | B1 | 1/2002 | Salesky et al. |
| 6,671,804 | B1 * | 12/2003 | Kent .............................. 713/175 |
| 6,854,056 | B1 * | 2/2005 | Benantar et al. .............. 713/156 |
| 7,013,327 | B1 | 3/2006 | Hickman et al. |
| 7,197,535 | B2 | 3/2007 | Salesky et al. |
| 7,310,675 | B2 | 12/2007 | Salesky et al. |
| 7,369,515 | B2 | 5/2008 | Salesky et al. |
| 7,418,476 | B2 | 8/2008 | Salesky et al. |

(Continued)

OTHER PUBLICATIONS

"CU-SeeMe Software Project"; Brought to you by the CU-SeeMe Development Team of the Advanced Technologies and Planning Group of the Network Resources Division of Cornell InformationTechnologies; http://myhome.hanafos.com/~soonjp/project.html; pp. 1-8; (1995).

(Continued)

*Primary Examiner* — William Powers
(74) *Attorney, Agent, or Firm* — BainwoodHuang

(57) ABSTRACT

Methods and systems for providing trusted signaling of domain-specific security policies. One method includes intercepting a connection request to a remote server from a client device on a domain and returning a security certificate with policy information for regulating the communications with the target server.

22 Claims, 1 Drawing Sheet

(56) References Cited

U.S. PATENT DOCUMENTS

| | | | |
|---|---|---|---|
| 7,426,191 | B2 | 9/2008 | Salesky et al. |
| 7,475,250 | B2* | 1/2009 | Aull et al. ............ 713/173 |
| 7,593,987 | B2 | 9/2009 | Salesky et al. |
| 7,627,663 | B2 | 12/2009 | Salesky et al. |
| 7,715,331 | B2 | 5/2010 | Salesky et al. |
| 7,716,344 | B2 | 5/2010 | Salesky et al. |
| 7,813,304 | B2 | 10/2010 | Salesky et al. |
| 7,822,859 | B2 | 10/2010 | Salesky et al. |
| 7,836,163 | B2 | 11/2010 | Salesky et al. |
| 7,877,489 | B2 | 1/2011 | Salesky et al. |
| 7,934,002 | B2 | 4/2011 | Salesky et al. |
| 2003/0140159 | A1 | 7/2003 | Campbell |
| 2005/0050362 | A1* | 3/2005 | Peles ............ 713/201 |
| 2005/0114653 | A1* | 5/2005 | Sudia ............ 713/158 |
| 2007/0294623 | A1* | 12/2007 | Saavedra ............ 715/730 |
| 2010/0306674 | A1 | 12/2010 | Salesky et al. |

OTHER PUBLICATIONS

"ORCA Video Conferencing System", Manual Written by the National Oceanic and Atmospheric Administration's Office of Ocean Resources Conservation and Assessment for Operation of the CU-SeeMe System; 26 pages; (1995).

Abdel-Waha, et al., "XTV: A Framework for Sharing X Window Clients in Remote Synchronous Collaboration"; IEEE Conference, pp. 1-15 (1991).

Bolot, et al., "Scalable Feedback Control for Multicast Video Distribution in the Internet"; SIGCOMM 94; London, England; pp. 58-67 (1994).

Chen, et al., "Real Time Video and Audio in the World Wide Web"; (1995).

Brad Cox, Ph.D.; "Global Schoolhouse Project"; http://www.virtualschool.edu/mon/Academia/GlobalSchoolhouseProject; 5 pages; (2010).

Crowley, et al.; "MMConf: An Infrastructure for Building Shared Multimedia Applications"; Proceedings of the 1990 ACM Conference on Computer—Supported Cooperative Work; pp. 329-342; (1990).

Delgrossi, et al.; "Media Scaling for Audiovisual Communication with the Heidelberg Transport System"; Conference Proceedings of the First ACM International Conference on Multimedia; pp. 99-104; (1993).

Dorcey; "CU-SeeMe Desktop Videoconferencing Software"; Connexions The Interoperability Report; vol. 9; No. 3; pp. 42-45; (1995).

Ensor, et al.; "The Rapport in Multimedia Conferencing System—A Software Overview"; downloaded from IEEE Xplore Jan. 2010; pp. 52-58; (1991).

Ensor, et al.; "Control Issues in Multimedia Conferencing"; IEEE Conference; downloaded from IEEE Xplore Jan. 2010; pp. 133-143; (1991).

Maly, et al.; "Mosaic + XTV = CoReview"; Computer Networks and ISDN Systems; 19 pages; (1995).

McCanne, et al.; "Receiver-driven Layered Multicast"; ACM SIGCOMM; pp. 1-14; (1996).

Savetz, et at.; "MBONE: Multicasting Tomorrow's Internet"; IDG Books Worldwide, Inc.; downloaded from http://www.savetz.com/mbone/ on Nov. 2009; 176 pages; (1996).

Sattler; "Internet TV with CU-SeeMe"; Book; 323 pages; (1995).

Cooper, et al.; "Internet X.509 Public Key Infrastructure Certificate and Certificate Revocation List (CRL) Profile"; Network Working Group; RFC 5280; pp. 1-151 (May 2008).

Wallace, et al; "Real-Time, Multi-Point, Multi-Speed, Multi-Strea Scalable Computer Network Communications System"; U.S. Appl. No. 09/523,315, filed Mar. 10, 2000; Abandoned.

* cited by examiner

METHODS AND SYSTEMS FOR PROVIDING TRUSTED SIGNALING OF DOMAIN-SPECIFIC SECURITY POLICIES

FIELD

The disclosure relates generally to providing trusted signaling of domain-specific security policies. More specifically, the disclosure relates to providing domain-specific security policies to application clients using SSL server certificates.

BACKGROUND

In some on-line environments, local IT security staff block all programs which may compromise or otherwise disclose information on a local domain to sources outside the domain. For example, local IT security staff block remote collaboration applications which may give users outside the local domain various rights to the screen or desktop of a computer on the domain. In a specific example, a remote collaboration tool may give a remote user external to a local domain the ability to control the desktop of a computer on the local domain. Healthcare, pharmaceutical, financial, defense, Federal Government, and other regulated, risk-averse IT environments are typical examples of environments where such programs are blocked. Thus, to be compatible with these types of secure environments, provisioning of on-line resources must permit local IT security staff to communicate policies to protect the interests of a specific domain.

One option for compatibility is to modify the registry on each computer. When using a computer's registry, a software client will always refer to the registry when executing. A problem with this solution is that it is difficult to deploy the registry settings to every computer on a network, which could be in the thousands. Another option would be to direct software toward an active directory. A problem with this solution, however, requires pre-programming of the software client.

SUMMARY

The deployment of security gateways and the need for them to create replacement SSL server certificates provides the opportunity to control the functionality of a network-based application client in a domain-specific and trusted fashion. For example, if the security gateway includes additional, application-specific extensions in an X.509v3 digital certificate profile when creating the replacement certificate, then the client has an opportunity to receive, validate and act on this digitally-signed information. Thus, local IT staff may modify a certificate profile to regulate and communicate policies for any functionality of network-based applications made available at target server located outside the local domain.

In one embodiment of the systems and methods disclosed herein, trusted signaling of domain-specific policies is provided by storing a replacement certificate at a proxy server on a local domain; intercepting by the proxy server a first outbound connection request received from a local application executing on a client computer on the local domain, wherein the request is to connect to a network-based application server outside the local domain; initiating a second outbound connection request to the network-based application server; facilitating the establishment of a first connection between the proxy server and the network-based application server in response to the second outbound connection request and using a target certificate for verifying the identity of the network-based application server; facilitating the establishment of a second connection between the proxy server and the client; and transmitting the replacement certificate to the client by the proxy server in response to the first outbound connection request; wherein the replacement certificate stores a policy for regulating the use of one or more applications being accessed at the network-based application server.

In various embodiments, the proxy server is an SSL-inspecting proxy server and the first and second connections are SSL connections. In some embodiments, the replacement certificate is an X.509v3 digital certificate. In some embodiments, the policy is stored as an extension in the X.509v3 digital certificate. In some embodiments, the local application is an on-line presentation participant software. In some embodiments, the network-based application server is an on-line presentation server. In some embodiments, the policy prohibits transmitting a desktop or screen image, files, or other information from the client computer outside of the local domain. In some embodiments, the policy prohibits giving remote control of the client computer to an entity outside the local domain.

In one embodiment of the systems and methods disclosed herein, trusted signaling of domain-specific policies is provided using a proxy server on a local domain for providing trusted signaling of domain-specific policies that includes a computer storage medium for storing a replacement certificate, which stores a policy for regulating the use of one or more applications being accessed at a network-based application server; and a network interface for intercepting by the proxy server a first outbound connection request received from a local application executing on a client computer on the local domain, wherein the request is to connect to a network-based application server outside the local domain, initiating a second outbound connection request to the network-based application server, facilitating the establishment of a first connection between the proxy server and the network-based application server in response to the second outbound connection request and using a target certificate for verifying the identity of the network-based application server, facilitating the establishment of a second connection between the proxy server and the client, and transmitting the replacement certificate to the client by the proxy server in response to the first outbound connection request.

BRIEF DESCRIPTION OF THE DRAWINGS

The foregoing discussion will be understood more readily from the following detailed description of the disclosure, when taken in conjunction with the accompanying drawings, in which.

DETAILED DESCRIPTION

Figure 1:
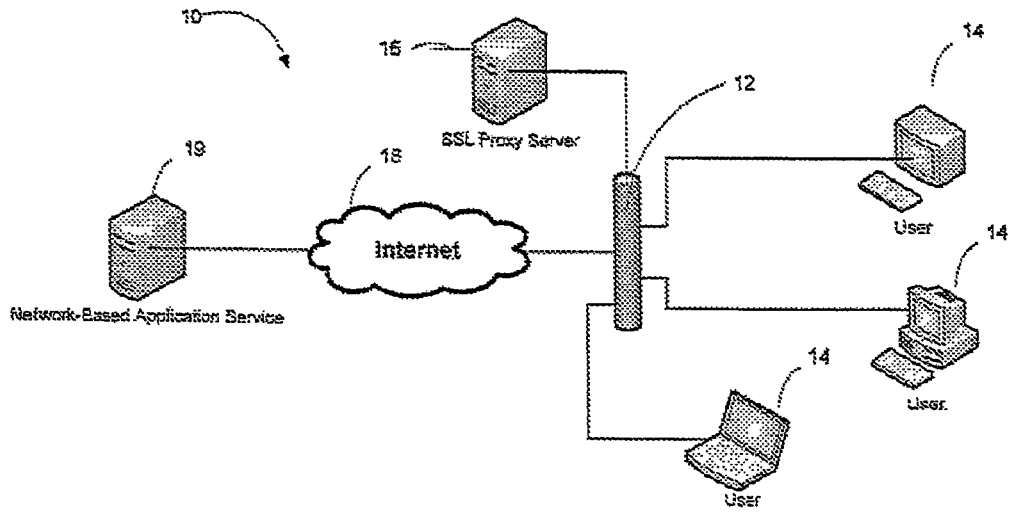
FIG. 1 shows an embodiment of distributed computing environment.

An embodiment of a distributed computing environment 10 is depicted in FIG. 1. The environment 10 comprises a local network or domain 12 of users 14. On the local network 12 is an SSL proxy server 16. The local network 12 is connected to an unsecure network, such as the Internet 18. A network-based application service 19 is also connected to the Internet 18.

Web security gateways or proxy servers, such as SSL proxy servers 16, are employed by a growing number of enterprises to mitigate risks associated with malware, sensitive data threat/leakage, and unauthorized access to objectionable Internet content or applications. Some of these gateways 16 intercept outbound connection requests and serve as a middle man between a client 14 and target 19. In doing so, the gateways 16 return a security certificate signed by a trusted, internal certificate authority. For example, an SSL proxy server 16 intercepts outbound SSL connection requests, generates "spoofed," replacement SSL server certificates which it returns to the requester 14, and then establishes a second SSL connection to the target server 19 identified in the request. The spoofed certificate is signed by an internal certificate authority that the enterprise controls. As long as the client 14 trusts the internal certificate authority, the security gateway 16 can act as a so-called "man in the middle" and inspect the plaintext traffic between the client 14 and target server 19.

Figure 2:
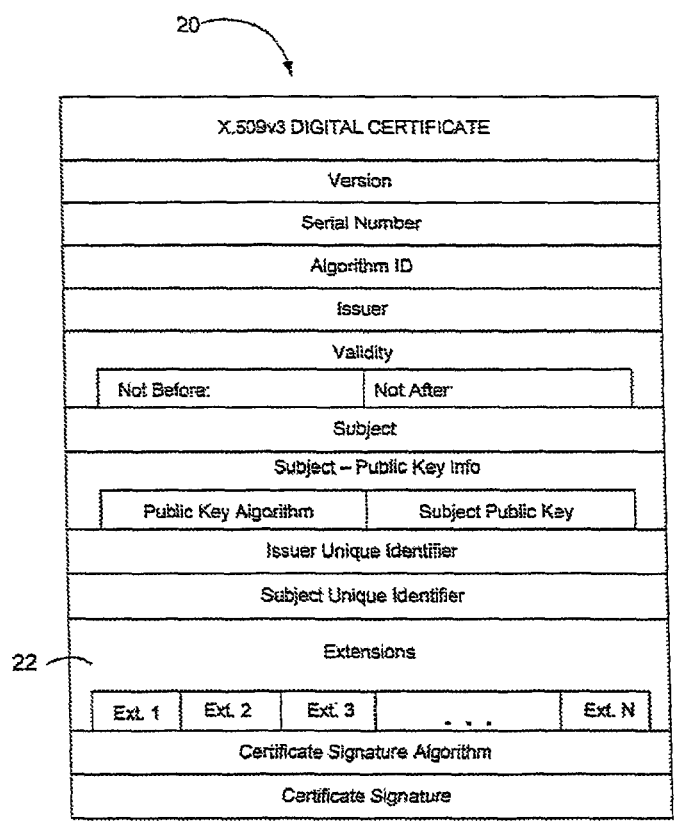
FIG. 2 shows an embodiment of a security certificate including policy information for regulating a network-based application.

These security certificates may be used to communicate local-IT administrators' policies for a particular network-based application available at a network-based application service 19 to clients 14 seeking access to the network-based application. As used herein, "network-based application" broadly refers to any application that uses information received from a network to operate. Digital security certificates are not limited to distributing only cryptographic information. For example, as illustrated in FIG. 2, an X.509v3 digital certificate 20 may optionally include one or more extensions 22 in its structure. These extensions 22 may be used to transmit data with the certificate 20. Ordinarily, in prior art systems, extensions 22 are used to distribute information about the certificate 20 itself, not for regulating policies regarding applications that may use the certificate 20. If the security gateway 16 adds application-specific extensions 22 in an X.509v3 digital certificate 20 profile when creating a replacement certificate to send to a client 14, then the client 14 has an opportunity to receive, validate, and act on this digitally-signed information. The information provided in these application-specific extensions 22 may be policy information that a browser or proprietary software application can interpret. More information on security certificates and extensions may be found in the Internet Engineering Task Force's (IETF) Request For Comments (RFC) 5280, entitled "Internet X.509 Public Key Infrastructure Certificate and Certificate Revocation List (CRL) Profile," from May 2008, which is incorporated in its entirety by reference herein. Thus, a trusted security certificate returned from an internal certificate authority can double as a distributor for policies regulating permissions granted to a network-based application for which the certificate was issued. In other words, functionality of a network-based application may be restricted through the SSL proxy process.

In various embodiments, the network-based application's client-side software is configured to detect and parse information included in a security certificate. The code is also adapted to communicate the policy conveyed in the certificate 20 to the application security layer in the client 14 for interpretation and enforcement. The client-side software is also able to accept and trust local certificate authorities either by accessing a local certificate store on the client computer or through additional logic and GUI elements to confirm acceptance of non-standard certificate authority root certificates by the user, e.g., such as exists within standard Internet browsers.

The following is a work flow example of an embodiment of the present disclosure. A user 14 directs its browser towards an on-line presentation application's server 19. The user 14 then downloads from the server 19 client software to run the on-line presentation. The user 14 next attempts to establish an SSL connection to an on-line presentation server. When initiating its outbound SSL communications with the on-line presentation server, the client software expects to receive a valid security certificate in response. A local SSL proxy server 16 intercepts the SSL connection request and establishes a connection with the on-line presentation server. The SSL proxy server 16 also returns a replacement certificate 20 in response to the outbound connection request. Because the certificate 20 is signed by a local certificate authority, the client 14 trusts the contents of the certificate 20. The certificate 20 includes policy information, stored in an extension 22 of the certificate, for identifying the rights and capabilities of the on-line presentation software running on the client computer 14. For example, in environments that prohibit presenting or giving remote control to a local computer's desktop to outside computers, if the certificate 20 includes appropriately encoded policy information along the lines of "On-Line Presentation Software—No Share Desktop" or "On-Line Presentation Software—No Remote Control," then the local IT security staff could allow employees to use the on-line presentation software with the desired functionality restrictions needed to comply with local policy. Accordingly, the on-line presentation software operates according to the restrictions and permissions identified in the security certificate.

Use of security certificates is beneficial because an internal certificate authority is a central place for IT to distribute updated policies to any machine on a domain that is seeking access to a particular network-based application. Because these systems already have a gateway for intercepting SSL requests and transmitting replacement certificates, it is beneficial to take advantage of these replacement certificates to simultaneously distribute policies to regulate the use of network-based applications with entities outside of a local, trusted domain.

For IT staff that are inclined to implement many web security controls at these security gateways, this method provides an advantage over, say, using Windows registry settings to signal policy to the application client. It also does not require IT staff to contact each network-based application vendor to request manually blocking or hobbling client functionality based on the requesting IP address. For vendors of security gateways and SSL-inspecting proxies in particular, this systems and methods disclosed herein provide a way to enhance the value of products to customers and better accommodate the needs of mutual customers.

Aspects of this disclosure are compatible with any browser or software client that has functionality distributed outside a local domain. A local computer will operate according to the policies identified in the trusted security certificate received from its local security certificate authority. For example, a digital security certificate may include a policy that prohibits the execution of various multimedia platforms, including Adobe Systems Inc.'s ADOBE FLASH PLAYER.

Various embodiments of this disclosure may be used to distribute domain-specific policies for downloading content or programs from servers outside of the domain by way of security certificates. In yet other embodiments, security certificates may be used to distribute domain-specific policies to regulate viewing and listening of streaming video or audio websites. The systems and methods disclosed herein are not limited to the examples disclosed, but are applicable to regulating domain-specific policies in instances where a security certificate is distributed.

The previously described embodiments may be implemented as a method, apparatus or article of manufacture using programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present disclosure.

Although the present disclosure has been described with reference to specific details, it is not intended that such details should be regarded as limitations upon the scope of the disclosure, except as and to the extent that they are included in the accompanying claims.

What is claimed is:

1. A method of regulating the use of a network-based on-line presentation application, comprising:
   storing domain specific administrator policies in a security gateway located in a local domain, wherein the domain specific administrator policies define rights and capabilities of client on-line presentation software when the client on-line presentation software is downloaded from a remote application server computer located outside the local domain and executed on any of a plurality of client computers located in the local domain;
   intercepting, by the security gateway, a secure connection request transmitted from a copy of the client on-line presentation software executing on a local client computer to the remote server computer, wherein the local client computer is one of the plurality of client computers located in the local domain, the client on-line presentation software executing on the local client computer providing an online presentation to a user of the local client computer, and wherein the client on-line presentation software executing on the local client computer was downloaded from the remote application server computer onto the local client computer;
   generating, by the security gateway, a replacement certificate, at least in part by copying the domain specific administrator policies into application specific extensions of the replacement certificate; and
   transmitting, by the security gateway to the local client computer, the replacement certificate, the domain specific administrator policies stored in the application specific extensions of the replacement certificate limiting actions performed by the client on-line presentation software executing on the local client computer in providing the on-line presentation to the user of the local client computer.

2. The method of claim 1, further comprising:
   wherein the limiting of the actions performed by the client on-line presentation software executing on the local client computer in providing the on-line presentation to the user of the local client computer includes interpreting, by a browser executing on the local client computer, the domain specific administrator policies stored in the application specific extensions of the replacement certificate.

3. The method of claim 1, further comprising:
   wherein the limiting of the actions performed by the client on-line presentation software executing on the local client computer in providing the on-line presentation to the user of the local client computer includes communicating, by the client on-line presentation software executing on the local client computer, the domain specific administrator policies stored in the application specific extensions of the replacement certificate to application security layer software of the local client computer and interpreting, by the application security layer software, the domain specific administrator policies.

4. The method of claim 3, wherein the application security layer software, in response to interpreting the domain specific administrator policies, enforces the domain specific administrator policies while the client on-line presentation software provides the on-line presentation to the user of the local client computer.

5. The method of claim 4, wherein the domain specific administrator policies include a policy prohibiting the on-line presentation software from transmitting files outside the local domain; and
   wherein the application security layer enforces the domain specific administrator policies by preventing the on-line presentation software from transmitting at least one file to a destination outside the local domain.

6. The method of claim 1, further comprising:
   wherein the storing of the domain specific administrator policies in the security gateway includes storing the domain specific administrator policies in a replacement certificate profile stored in the security gateway;
   modifying, by local information technology (IT) staff, the domain specific administrator policies stored in the security gateway by modifying the domain specific administrator policies stored in the replacement certificate profile; and
   wherein the generating of the replacement certificate by the security gateway includes copying the modified domain specific administrator policies from the replacement certificate profile into the application specific extensions of the replacement certificate.

7. The method of claim 1, further comprising:
   digitally signing, by a local certificate authority controlled by an enterprise that also controls the local domain, the replacement certificate, including creating a digital signature of the local certificate authority;
   wherein transmitting the replacement certificate to the local client computer includes transmitting the digital signature of the local certificate authority to the local client computer for validating, by the client on-line presentation software executing on the local client computer, based on the digital signature of the local certificate authority, the domain specific administrator policies stored in the application specific extensions of the replacement certificate, prior to limiting the actions performed by the client on-line presentation software executing on the local client computer.

8. The method of claim 7, further comprising:
   wherein the domain specific administrator policies prohibit the client on-line presentation software from
      presenting a virtual desktop of any of the plurality of client computers located in the local domain to any computer located outside of the local domain,
      giving remote control of the virtual desktop of any of the plurality of client computers located in the local domain to any computer located outside of the local domain, executing at least one multimedia platform on any of the plurality of client computers located in the local domain, presenting at least one streaming video website on any of the plurality of client computers located in the local domain, and presenting at least one streaming audio website on any of the plurality of client computers located in the local domain; and wherein limiting the actions performed by the client on-line presentation software executing on the local client computer includes preventing the client on-line presentation software executing on the local client computer from presenting a virtual desktop of the local client computer to any computer located outside of the local domain, giving remote control of the virtual desktop of the local client computer to any computer located outside of the local domain, executing the at least one multimedia platform on the local client computer, presenting the at least one streaming video website on the local client computer to the user of the local client computer, and presenting the at least one streaming audio website on the local client computer to the user of the local client computer.

9. The method of claim 1, further comprising:

wherein the domain specific administrator policies prohibit the client on-line presentation software from presenting a virtual desktop of any of the plurality of client computers located in the local domain to any computer located outside of the local domain; and wherein limiting the actions performed by the client on-line presentation software executing on the local client computer includes preventing the client on-line presentation software executing on the local client computer from presenting a virtual desktop of the local client computer to any computer located outside of the local domain.

10. The method of claim 1, further comprising:

wherein the domain specific administrator policies prohibit the client on-line presentation software from giving remote control of a virtual desktop of any of the plurality of client computers located in the local domain to any computer located outside of the local domain; and wherein limiting the actions performed by the client on-line presentation software executing on the local client computer includes preventing the client on-line presentation software executing on the local client computer from giving remote control of a virtual desktop of the local client computer to any computer located outside of the local domain.

11. The method of claim 1, further comprising:

wherein the domain specific administrator policies prohibit the client on-line presentation software from executing at least one multimedia platform on any of the plurality of client computers located in the local domain; and wherein limiting the actions performed by the client on-line presentation software executing on the local client computer includes preventing the client on-line presentation software executing on the local client computer from executing the at least one multimedia platform on the local client computer.

12. The method of claim 1, further comprising:

wherein the domain specific administrator policies prohibit the client on-line presentation software from presenting at least one streaming video website on any of the plurality of client computers located in the local domain; and wherein limiting the actions performed by the client on-line presentation software executing on the local client computer includes preventing the client on-line presentation software executing on the local client computer from presenting the streaming video website on the local client computer to the user of the local client computer.

13. The method of claim 1, further comprising:

wherein the domain specific administrator policies prohibit the client on-line presentation software from presenting at least one streaming audio website on any of the plurality of client computers located in the local domain; and wherein limiting the actions performed by the client on-line presentation software executing on the local client computer includes preventing the client on-line presentation software executing on the local client computer from presenting the streaming audio website on the local client computer to the user of the local client computer.

14. A security gateway, located in a local domain, for regulating the use of a network-based on-line presentation application, comprising:

at least one processor;

a memory storing i) domain specific administrator policies that define rights and capabilities of client on-line presentation software when the client on-line presentation software is downloaded from a remote application server computer located outside the local domain and executed on any of a plurality of client computers located in the local domain, and ii) program code, which, when executed on the processor, causes the security gateway to intercept a secure connection request transmitted from a copy of the client on-line presentation software executing on a local client computer to the remote server computer, wherein the local client computer is one of the plurality of client computers located in the local domain, the client on-line presentation software executing on the local client computer providing an online presentation to a user of the local client computer, and wherein the client on-line presentation software executing on the local client computer was downloaded from the remote application server computer onto the local client computer;

generate a replacement certificate, at least in part by copying the domain specific administrator policies into application specific extensions of the replacement certificate; and transmit, to the local client computer, the replacement certificate, wherein the domain specific administrator policies stored in the application specific extensions of the replacement certificate limit actions performed by the client on-line presentation software executing on the local client computer in providing an on-line presentation to a user of the local client computer.

15. The security gateway of claim 14, further comprising:

wherein the domain specific administrator policies in the memory are stored in a replacement certificate profile; and wherein the program code, when executed on the processor, further causes the security gateway to:
modify, in response to local information technology (IT) staff, the domain specific administrator policies stored in the replacement certificate profile, and
generate the replacement certificate at least in part by copying the modified domain specific administrator policies from the replacement certificate profile into the application specific extensions of the replacement certificate.

16. The security gateway of claim 14, wherein the program code, when executed on the processor, further causes the security gateway to:
digitally sign the replacement certificate by including a digital signature with the replacement certificate when transmitting the replacement certificate to the to the local client computer so that the client on-line presentation software executing on the local client computer validates the domain specific administrator policies stored in the application specific extensions of the replacement certificate based on the digital signature, prior to limiting the actions performed by the client on-line presentation software executing on the local client computer based on the domain specific administrator policies.

17. The security gateway of claim 16, further comprising:
wherein the domain specific administrator policies prohibit the client on-line presentation software from
presenting a virtual desktop of any of the plurality of client computers located in the local domain to any computer located outside of the local domain,
giving remote control of the virtual desktop of any of the plurality of client computers located in the local domain to any computer located outside of the local domain,
executing at least one multimedia platform on any of the plurality of client computers located in the local domain,
presenting at least one streaming video website on any of the plurality of client computers located in the local domain, and
presenting at least one streaming audio website on any of the plurality of client computers located in the local domain; and
wherein the domain specific administrator policies stored in the application specific extensions of the replacement certificate limit the actions performed by the client on-line presentation software executing on the local client computer by preventing the client on-line presentation software executing on the local client computer from
presenting a virtual desktop of the local client computer to any computer located outside of the local domain,
giving remote control of the virtual desktop of the local client computer to any computer located outside of the local domain,
executing the at least one multimedia platform on the local client computer,
presenting the at least one streaming video website on the local client computer to the user of the local client computer, and
presenting the at least one streaming audio website on the local client computer to the user of the local client computer.

18. The security gateway of claim 14, further comprising:
wherein the domain specific administrator policies stored in the memory prohibit the client on-line presentation software from presenting a desktop of any of the plurality of client computers located in the local domain to any computer located outside of the local domain, and
wherein the domain specific administrator policies stored in the application specific extensions of the replacement certificate limit the actions performed by the client on-line presentation software executing on the local client computer by preventing the client on-line presentation software from presenting a virtual desktop of the local client computer to any computer located outside of the local domain.

19. The security gateway of claim 14, further comprising:
wherein the domain specific administrator policies prohibit the client on-line presentation software from giving remote control of a desktop of any of the plurality of client computers located in the local domain to any computer located outside of the local domain; and
wherein the domain specific administrator policies stored in the application specific extensions of the replacement certificate limit the actions performed by the client on-line presentation software executing on the local client computer by preventing the client on-line presentation software executing on the local client computer from giving remote control of a virtual desktop of the local client computer to any computer located outside of the local domain.

20. The security gateway of claim 14, further comprising:
wherein the domain specific administrator policies prohibit the client on-line presentation software from executing at least one multimedia platform on any of the plurality of client computers located in the local domain; and
wherein the domain specific administrator policies stored in the application specific extensions of the replacement certificate limit the actions performed by the client on-line presentation software executing on the local client computer by preventing the client on-line presentation software executing on the local client computer from executing the at least one multimedia platform on the local client computer.

21. The security gateway of claim 14, further comprising:
wherein the domain specific administrator policies prohibit the client on-line presentation software from presenting at least one streaming video website on any of the plurality of client computers located in the local domain; and
wherein the domain specific administrator policies stored in the application specific extensions of the replacement certificate limit the actions performed by the client on-line presentation software executing on the local client computer by preventing the client on-line presentation software from presenting the streaming video website on the local client computer to the user of the local client computer.

22. The security gateway of claim 14, further comprising:
wherein the domain specific administrator policies prohibit the client on-line presentation software from presenting at least one streaming audio website on any of the plurality of client computers located in the local domain; and
wherein the domain specific administrator policies stored in the application specific extensions of the replacement certificate limit the actions performed by the client on-line presentation software executing on the local client computer by preventing the client on-line presentation software from presenting the streaming audio website on the local client computer to the user of the local client computer.

* * * * *